Sept. 7, 1926.
J. AIKEN
1,599,389
TRANSMISSION MECHANISM
Filed Sept. 16, 1924     2 Sheets-Sheet 1
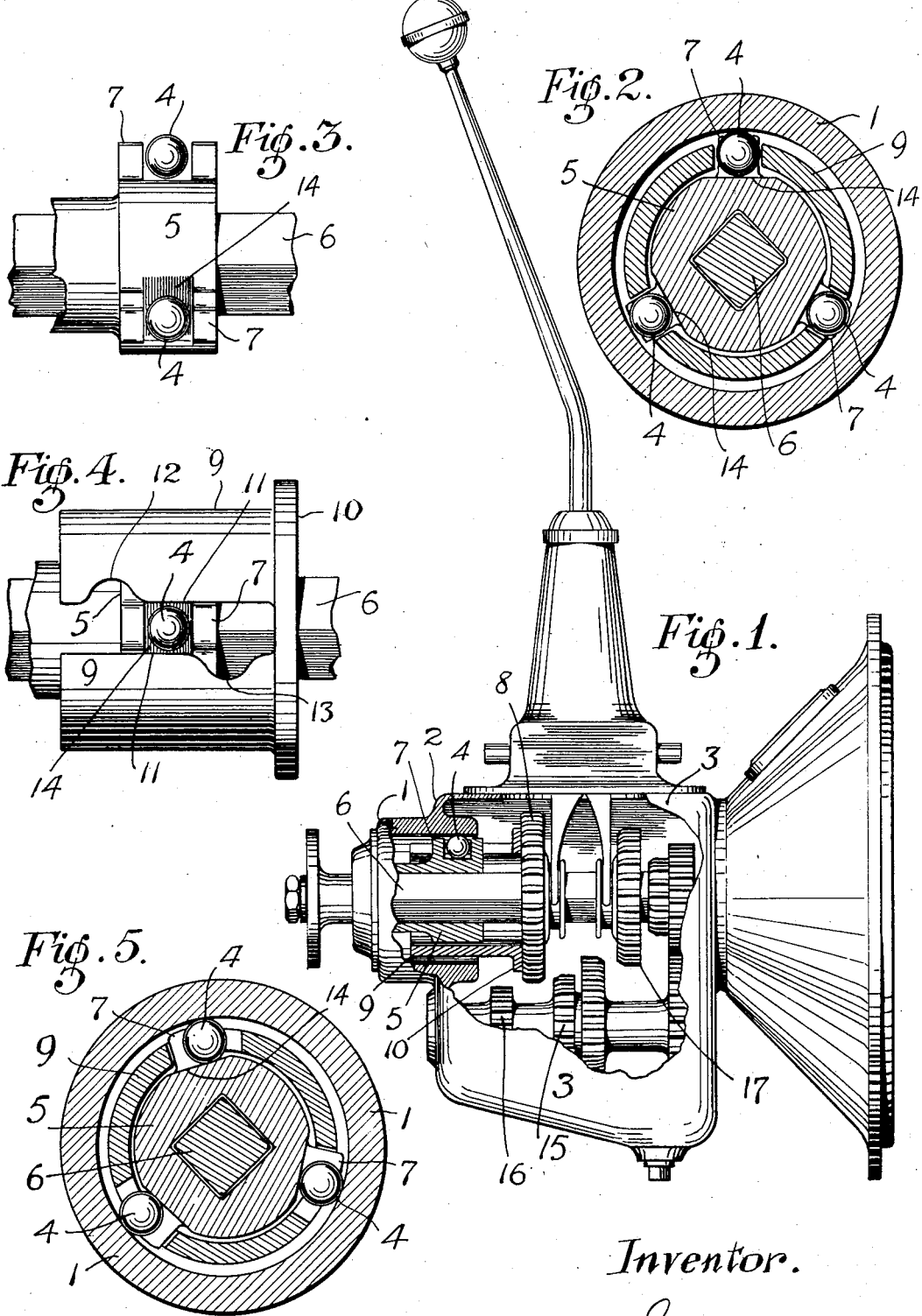
Inventor.
James Aiken Sept. 7, 1926.  1,599,389
J. AIKEN
TRANSMISSION MECHANISM
Filed Sept. 16, 1924    2 Sheets-Sheet 2
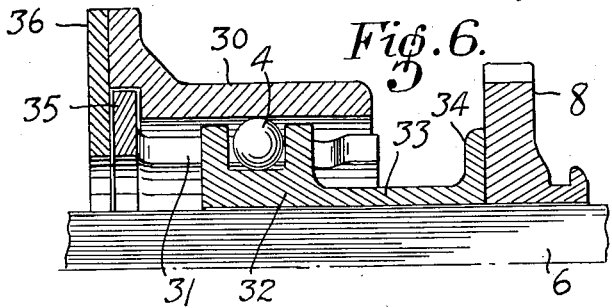
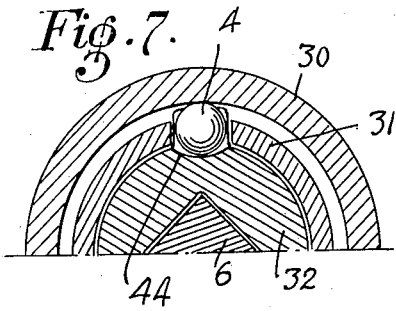
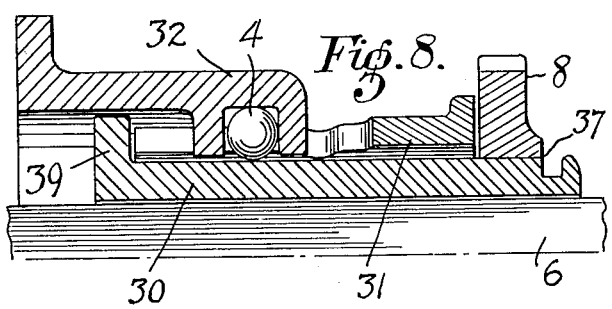
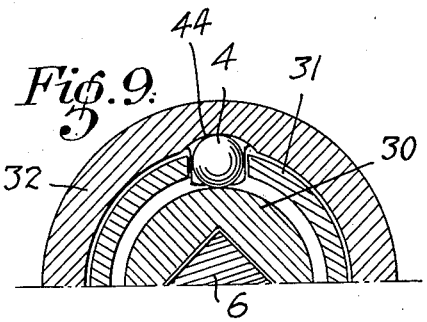
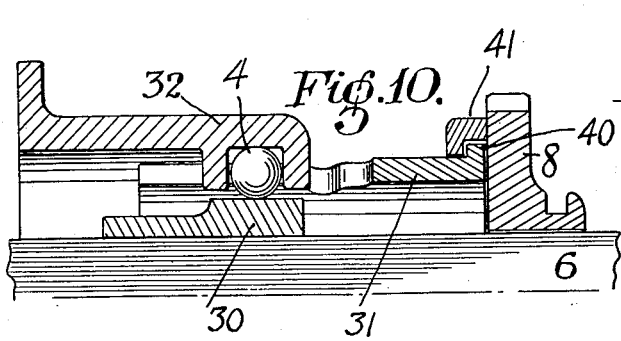
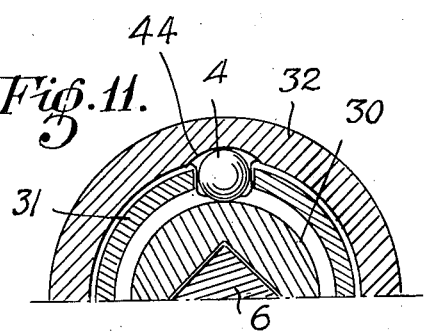
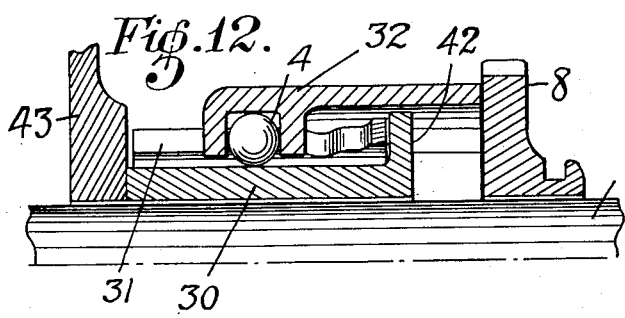
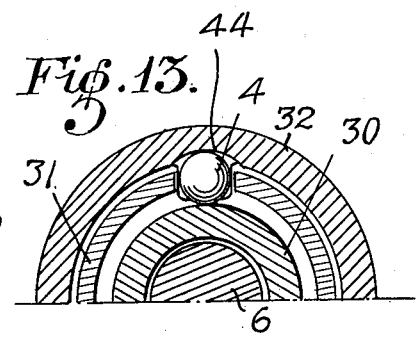
Inventor.

Patented Sept. 7, 1926.

1,599,389

UNITED STATES PATENT OFFICE.

JAMES AIKEN, OF NEW YORK, N. Y.

TRANSMISSION MECHANISM.

Application filed September 16, 1924. Serial No. 738,025.

This invention relates to means for use in connection with transmission mechanism particularly for automobiles, for preventing movement of the driven shaft in a direction opposite to that for which the transmission mechanism is set.

One object of the present invention is to provide means adapted to serve as a retaining or locking device for preventing backward movement of the vehicle when the transmission is set for a forward drive and to similarly prevent forward movement when the gear is set for a reverse drive. A further object of the invention is to so control the setting of the retaining or locking device from the gear shift means that the said device is automatically set in position to give the desired result.

The improved device is preferably fitted in connection with the usual sliding gear through which the low speed forward drive and the reverse drive are transmitted to the propeller shaft of the vehicle, and the device is adapted to shift with said gear in order to permit rotary movement of the propeller shaft in the desired direction and to preclude the possibility of motion of the said shaft in the opposite direction.

While the transmission mechanism is in the neutral position or is set for high or intermediate speeds, the device remains inoperative, but when the transmission is set for the low speed forward drive or for the reverse drive the device is automatically brought into operation whether the clutch be engaged or disengaged.

In its preferred form the device comprises an anchored member co-operating with means controlled from the usual shift means of the transmission mechanism, whereby movement of the propeller shaft and of the vehicle in a reverse direction is prevented whilst the transmission is set for the low speed forward drive and whereby movement in the forward direction is prevented when the transmission is set for the reverse drive.

I will now proceed to describe in detail the construction and operation of the device, with reference to the accompanying drawings which show by way of illustration or example suitable forms of the device as applied to an ordinary automobile transmission of the selective type. On the said drawings:—

Fig. 1 is a side view, partly in vertical section, showing the transmission mechanism with the improved device applied thereto.

Figs. 2 to 13 inclusive are detail views drawn to an enlarged scale. Fig. 2 is a cross section of the device taken through the center line of the locking members. Fig. 3 is a side view of the locking members and their carrier. Fig. 4 is a plan view of the same, but also showing the control sleeve. Fig. 5 is a section corresponding to Fig. 2, but showing the device in the locked position.

Figs. 6 and 7 are respectively a longitudinal section, and a cross section corresponding to Fig. 2, but showing one half of a modified form of the device. Figs. 8 and 9 are views corresponding to Figs. 6 and 7, but showing a third form of the device. Figs. 10 and 11 are similar views showing a fourth form, and Figs. 12 and 13 are similar views showing a fifth form of the device.

Referring to Figs. 1 to 5 inclusive of the accompanying drawings, a sleeve part 1 is formed integral with the end wall 2 of the transmission casing 3 (or is secured thereto in any suitable manner), and the cylindrical internal surface of this sleeve 1 is engaged by balls or rolling or sliding members 4 which latter are located in peripheral recesses in a rotary member 5 fast upon the propeller shaft 6 of the automobile. Provided at each side of the rotary member 5 is a series of outwardly projecting lugs or projections 7 adapted to prevent movement of the balls 4 in an axial direction. Secured on one side of the usual low and reverse sliding gear 8 is a tubular member 9 having a flange 10 for the attachment thereof to the said gear. This tubular member 9 extends between the fixed member 1 and the rotary member 5 and has longitudinal slots therein for the reception of the balls 4 and of the said lugs 7 which retain the balls in position. The said slots in the tubular member 9 are each formed with parallel edges 11 and with recessed or off-set portions 12, 13 as clearly shown at Fig. 4, and the peripheral recesses in the rotary member 5 are formed with their surfaces 14 flat or curved so as to converge towards the internal cylindrical surface of the fixed member 1 at the extremities of said recesses.

When the balls are located between the parallel edges 11 of the said slots, the balls are accommodated within the peripheral recesses at the points of maximum depth of the recesses, and circumferential movement of the balls relatively to the rotary member 5 is prevented.

Movement of the sliding gear 8 towards the right hand side Fig. 1 brings such gear into mesh with the countershaft low speed gear 15 and at the same time brings the recessed portion 12 of each slot into line with its ball 4 so that said balls are free to move into the converging portions of the peripheral recesses and reverse movement of the propeller shaft through a very small angle is sufficient to tightly wedge the balls between the cylindrical surface of the member 1 and the surfaces 14 of the peripheral recesses, as clearly shown at Fig. 5.

When the sliding gear 8 is moved into engagement with the reverse idler (not shown, but which in turn meshes with the countershaft reverse gear 16) for the reverse drive, the other set of recesses 13 are brought into line with the balls 4 so that forward movement of the propeller shaft is similarly prevented.

While the gear is in neutral position, as shown at Figs. 1, 2 and 4 of the drawings, and also while motion is being transmitted through the second and high sliding gear 17, the parallel portions 11 of the slots between said recessed portions 12 and 13 are in line with the balls 4 and the wedging action of the balls is prevented.

When used in connection with the transmission mechanism of an automobile, the device permits of the vehicle being started upon an incline without the use of the ordinary brake, and the vehicle may thus be started and driven up-hill, either ahead or in reverse, without necessitating the somewhat troublesome procedure of simultaneously releasing the brake, engaging the clutch, and opening the throttle.

In the modified arrangements illustrated at Figs. 6 to 13 inclusive, the members having the cylindrical surfaces are identified by the numeral 30; the slotted sleeve members are identified by the numeral 31; and the members having the recesses for the balls 4 are identified by the numeral 32.

In the form shown at Figs. 6 and 7, the member 32 is secured to the low and reverse sliding gear 8 by means of an extension 33 and flange 34, whilst the member 30 is secured to (or is integral with) the end wall 2 of the transmission casing. The member 31, in this form of the device, is free to rotate with the propeller shaft 6 and the member 32, but is prevented from moving in an axial direction by means of a flange 35 which is free to rotate between the fixed member 30 and a ring or washer 36.

In the form shown at Figs. 8 and 9 the member 32 is anchored, being preferably secured to the transmission casing, so that the balls 4, in this form of the device, do not rotate about the axis of the propeller shaft. The member 30 is secured to the gear wheel 8 at 37 and has, at its opposite end, a flange 39 which engages one end of the sleeve member 31 whilst the opposite end of the sleeve engages against the wheel 8 in such manner that the sleeve member 31 is shifted in an axial direction with the wheel 8 although it does not rotate therewith.

In the form shown at Figs. 10 and 11, the member 32 is anchored as in the form shown at Figs. 8 and 9, whilst the member 30 is secured to the propeller shaft 6 so that it rotates with the wheel 8, but is incapable of axial movement; the sleeve member 31 in this form being attached to the wheel 8 by means of a flange 40 thereon and a guide ring 41 secured on the gear 8 so that it is shifted axially with the said wheel 8 although no rotary motion is imparted thereto.

In the form shown at Figs. 12 and 13, the member 32 is secured to the gear wheel 8 so that it is rotated and is shifted axially therewith. The member 30 in this form is preferably secured to the transmission casing; whilst the sleeve member 31 is fitted between a flange 42 on the member 30 and a fixed part 43 which preferably forms part of the end wall of the casing; the sleeve member 31, in this form, being caused to rotate with the wheel 8 and propeller shaft 6, but being incapable of axial movement.

The locking device may consist of three or other suitable number of balls 4 as shown on the drawings, and the recesses for the reception of the balls may be formed by flattening parts 14 of the ball carrying members (see Figs. 2 to 5) or by suitably recessing such members as shown at 44 Figs. 7, 9, 11 and 13, or in other suitable manner so as to form spaces with converging extremities within which the balls 4 may lock for the purpose above described.

Instead of balls, as shown on the drawings, it will be readily understood that rollers or wedge pieces or sliding shoes or such like may be employed.

It is obvious that the forms illustrated are a few of the many forms in which my invention may be embodied, and I do not mean to limit myself to these particular forms, as the same can be changed in many respects without departing from the spirit of my invention.

What I claim is:—

1. In transmission mechanism having shift means whereby it may be set for a forward or reverse drive, a device for preventing reverse movement of the driven shaft when the mechanism is set for a forward drive, and for preventing forward movement of said shaft when the mechanism is set for a reverse drive, and means for controlling the device from the gear shift means.

2. In transmission mechanism having shift means whereby it may be set for forward drives at different speed ratios or for a reverse drive, a device for preventing reverse movement of the driven shaft when the mechanism is set for the forward drive having the lowest speed ratio, and for preventing forward movement of said shaft when the mechanism is set for a reverse drive.

3. In transmission mechanism having shift means whereby it may be set for a forward or reverse drive, a device comprising a cylindrical member and a member carrying at least one locking element for preventing rotary motion of the driven shaft in one direction whilst permitting motion in the other direction, and a control device operated from the said shift means to control the operation of said device to prevent rotation of the said shaft in the direction opposite to that for which the transmission is set by the shift means.

4. In transmission mechanism for automobiles, means for preventing movement of the vehicle in a direction opposite to that for which the transmission is set, comprising fixed and rotary members, and means—operated from the usual sliding gear for the reverse and low speed forward drives—co-operating with the said fixed and rotary members so as to permit movement of the vehicle only in the desired direction.

5. In transmission mechanism for automobiles, means for preventing movement of the vehicle in a direction opposite to the desired direction of travel, comprising fixed and rotary elements, locking means co-operating with both such elements, and a control device—movable with the usual sliding gear for the reverse and low speed forward drives—and co-operating with the said locking means to either permit a forward and prevent a reverse movement or to permit a reverse and prevent a forward movement.

6. In transmission mechanism for automobiles, means for preventing movement of the vehicle in a direction other than that for which the transmission is set, comprising an anchored member, a member rotating with the propeller shaft of the vehicle, wedging means between such members, and a control device secured to the usual sliding gear for the reverse and low speed forward drives and so co-operating with said wedging means as to set these means to prevent reverse movement of the propeller shaft when the transmission is set for the low speed forward drive, to prevent forward movement of the said shaft when the transmission is set for the reverse drive, or to permit free rotary motion of said shaft in either direction when the transmission is in the neutral position or is set for a forward drive at a higher speed ratio.

7. In a transmission mechanism for automobiles, stop mechanism, comprising an anchored element, a rotary member carried by the driven shaft, at least one locking device co-operating with both said element and member to prevent rotary movement of the said shaft in one direction, a control member extending between the anchored element and the rotary member, and means for moving one of said members axially to control the operation of the locking device.

8. In a change speed and reversing mechanism for automobiles, stop means comprising an anchored element, a rotary member mounted on the driven shaft, at least one locking device co-operating with both said element and member to prevent rotary motion of the said shaft in one direction, a control member extending between the anchored element and the rotary member, and means for controlling the operation of said locking device from the shift mechanism of the gear by axial movement of one of said members.

9. In transmission mechanism for automobiles, a device comprising a stationary member, a rotary member carried by the propeller shaft of the vehicle, means co-operating with the said stationary and rotary members for preventing rotation of the rotary member in one direction, and a slotted axially movable control device extending between the said members and co-operating with said means to render same operative or inoperative and to determine the direction in which the rotation of the rotary member is prevented.

10. In transmission mechanism comprising a gear wheel slidably mounted on the driven shaft, and means for shifting said wheel into mesh with the reverse and the low speed forward drive gears, a member having a cylindrical surface, a recessed member, such recesses being shaped so as to form with the said cylindrical surface a series of spaces having converging ends, and one of such members being prevented from rotating whilst the other is caused to rotate with the driven shaft, a series of locking elements mounted in the said spaces, and a control device comprising a part extending axially between the said members and having—for the accommodation of the said locking elements—longitudinally extending guide slots with side recesses for permitting the locking elements to move into the converging ends of the spaces to lock the driven shaft.

11. Transmission mechanism having driving and driven shafts, gears for transmitting rotary motion at different speed ratios from the driving to the driven shaft, and shift mechanism for changing the gear ratio in combination with a lock device for preventing rotary motion of the driven shaft in one direction, comprising at least one locking element, a member having a cylindrical surface for engaging such element, a member having at least one recess shaped to co-operate with the said cylindrical surface to form a space having converging ends to receive the locking element, means for anchoring one of said members, and means for guiding the said locking element in the said space.

12. Transmission mechanism having driving and driven shafts, gears for transmitting rotary motion at different speed ratios from the driving to the driven shaft, and shift mechanism for changing the gear ratio, in combination with a lock device for preventing rotary motion of the driven shaft in one direction, comprising a plurality of wedging elements, an annular member having a cylindrical surface for engagement with such elements, an adjacent member having a plurality of recesses each converging at its ends toward the said cylindrical surface, and accommodating one of the wedging elements, means for anchoring one of said members and means for guiding the elements in said recesses and for controlling their positions therein.

13. Transmission mechanism having driving and driven shafts, gears for transmitting rotary motion at different speed ratios from the driving to the driven shaft, and shift mechanism for changing the gear ratio, in combination with a lock device for preventing rotary motion of the driven shaft in one direction, comprising a plurality of wedging elements, an annular member having a cylindrical surface for wedging engagement with such elements when the lock device is in operation, a member for carrying the said elements, means for anchoring one of said members, and a control device consisting of a sleeve having slots for retaining the wedging elements in the inoperative position and offset portions for permitting the said elements to move into their locking positions.

14. Transmission mechanism having driving and driven shafts, gears for transmitting rotary motion at different speed ratios from the driving to the driven shaft, and shift mechanism for changing the gear ratio, in combination with a lock device for preventing rotary motion of the driven shaft in one direction, comprising at least one wedging element, a member having means for carrying the wedging element, a control member having means for guiding the said element, means for moving one of the said members in an axial direction relatively to the other to control the operation of the wedging element, and means including an anchored annular surface concentric to the axis of rotation, for wedging engagement with said element.

15. Transmission mechanism having driving and driven shafts, gears for transmitting rotary motion at different speed ratios from the driving to the driven shaft, and shift mechanism for changing the gear ratio, in combination with a lock device for preventing rotary motion of the driven shaft in one direction, comprising a series of wedging elements, an annular member for carrying the said elements, a control member having means for controlling the circumferential movement of the elements on their carrying member, means for shifting one of said members in an axial direction relatively to the other member to control said movement of the wedging elements, and means including an anchored concentric annular surface for wedging engagement with the said elements when the operation of the latter is permitted by the said control member.

In testimony whereof I affix my signature.

JAMES AIKEN.

DISCLAIMER 1,599,389.—*James Aiken*, New York, N. Y. TRANSMISSION MECHANISM. Patent dated September 7, 1926. Disclaimer filed June 12, 1935, by the patentee.

Hereby enters this disclaimer to that part of the subject-matter which is contained in claims numbered 1, 2, 3, 4, and 5.

[*Official Gazette July 2, 1935.*]